March 26, 1968    J. RIJNDERS ET AL    3,375,363
VEHICLE HEADLIGHTS WITH PROFILED COVER GLASSES
Filed Oct. 6, 1965    4 Sheets-Sheet 1

INVENTORS
JOHANNES RIJNDERS
WILLEM ELENBAAS
BY
AGENT

March 26, 1968    J. RIJNDERS ET AL    3,375,363
VEHICLE HEADLIGHTS WITH PROFILED COVER GLASSES
Filed Oct. 6, 1965    4 Sheets-Sheet 2

INVENTORS
JOHANNES RIJNDERS
WILLEM ELENBAAS
BY
AGENT

March 26, 1968   J. RIJNDERS ET AL   3,375,363
VEHICLE HEADLIGHTS WITH PROFILED COVER GLASSES
Filed Oct. 6, 1965   4 Sheets-Sheet 3

INVENTORS
JOHANNES RIJNDERS
WILLEM ELENBAAS
BY
AGENT

United States Patent Office 3,375,363
Patented Mar. 26, 1968

3,375,363
VEHICLE HEADLIGHTS WITH PROFILED COVER GLASSES
Johannes Rijnders and Willem Elenbaas, Emmasingel, Eindhoven, Netherlands, assignors to North American Philips Company, Inc., New York, N.Y., a corporation of Delaware
Filed Oct. 6, 1965, Ser. No. 493,417
Claims priority, application Netherlands, Oct. 14, 1964, 64—11,903
4 Claims. (Cl. 240—41.25)

ABSTRACT OF THE DISCLOSURE

A vehicle headlight with a reflector constituted of two concave mirrors connected together and two filaments co-acting therewith. The cover glass is profiled to effect a different measure of transverse spreading of the light at the bottom thereof.

---

Various possibilities are known to obtain an anti-dazzle light beam by means of a vehicle headlight. The most conventional manner is to arrange a filament in such a headlight between the focus of the parabolic reflector occurring therein and the cover glass substantially along the axis of that paraboloid and to provide a screen below the said filament. The object of this latter is to eliminate the lower half of the reflector when a light beam is produced. The drawback of this construction is that only half of the available reflector surface cooperates in the formation of the anti-dazzle light beam. So in this case the maximally possible effect is not obtained in the formation of that light beam.

A vehicle headlight is also known with a cover glass and a concave mirror system cooperating with two filaments, which system is built up from two mirror parts each formed as a paraboloid of revolution. The approximately equally directed axes of the said paraboloid of revolution do not coincide. In addition the connection of the said mirror parts extends at least substantially though the top of the mirror system. The focus of the mirror part which, in the operating condition of the headlight, is located uppermost is farther remote from the cover glass than the focus of the mirror part which is located lowermost.

This headlight presents the possibility of allowing a filament, which is arranged in the proximity of the focus of the uppermost mirror part and which is destined for producing an anti-dazzle beam, to cooperate with both mirror parts. This known headlight has the drawback, however, that as a result of the failure of particular provisions no great efficiency is obtained of the light emitted by the filament in question. The present invention has for its object to improve the said known headlight to such an extent that a considerable improvement in efficiency is obtained as compared with the above described known headlight.

For that purpose the vehicle headlight of the above-mentioned type according to the present invention is characterized in that in or in the proximity of and parallel to the axis of the uppermost mirror part a straight helical filament is arranged so that its axis is located between the focus of the said mirror part and the cover glass, and the lowermost mirror part extends in the direction of the cover glass over such a distance that the elongation of the line through the end of that filament facing the cover glass and through the focus of the lowermost mirror part intersects the latter substantially in its extreme edge. Further characteristic features of the said headlight are that the cover glass adjoins the said extreme edge and that at the area of the outer edge of the lowermost half of the said cover glass a region is present which is profiled and which effects a different measure of transverse spreading of the traversing light than the adjacent more central part of the lower half of that glass.

As a result of this choice of the location of the filament with respect to the focus and the edge of the lowermost mirror half, the full advantage is obtained both of the uppermost and the lowermost mirror half in the formation of the anti-dazzle light beam in question, without the possibility of dazzling occurring. In addition, since the cover glass substantially adjoins the lowermost mirror half, the possibility is obtained to take full advantage also of the light which impinges upon that extreme edge of that mirror half. This is realized according to the invention by providing the outer edge of the lower half of the cover glass with a region which, as already described, effects a different transverse spreading of the traversing light and, according to a favourable embodiment of the invention, effects a stronger transverse spreading of the traversing light than the more central part of that cover glass.

The vehicle headlight according to the invention may be used to produce exclusively an anti-dazzle light beam. In motor-car lighting systems of the so-called American type, in which four headlights are provided on a motor-car, two of the headlights according to the invention could be used to produce the anti-dazzle beams.

When, however, according to a favourable embodiment of the invention, the headlight is constructed so that a second straight helical filament is arranged therein at the area of the focus of the lowermost mirror part with its axis according to or parallel to the axis of that mirror part, the said second filament, in co-operation with the two mirror parts, can produce a beam with long-range properties of a very satisfactory quality.

The headlight according to the invention may be of the so-called sealed-beam type. This means that the light sources, the reflector and the cover glass are formed as one unit and the filaments operate in the gas-tight closed space, which is formed by the mirrors and the cover glass. However, it is alternatively possible to arrange the reflectors in a housing which is closed on its front by the cover glass, the light sources in the said housing which each comprise a separate bulb being arranged as separate lamps which can be replaced.

According to a further embodiment of the invention, the headlight according to the invention comprises two, mainly tubular, filaments of the so-called regenerative type. Such lamps are formed, for example, by so-called iodine filament lamps. In order to create the correct operating conditions in such a lamp (temperature distribution during operation and the like) it is simpler to use two separate lamps instead of one lamp with two different filaments. As a result of the mutual location of the foci in the headlight according to the invention, the latter is particularly suitable for providing therein two separate filament lamps of the regenerative type so that they can be replaced.

In order that the invention may readily be carried into effect, it will now be described in greater detail, by way of example, with reference to the accompanying drawings, in which an embodiment is shown of the headlight according to the invention which is constructed for producing an anti-dazzle light beam and a principal beam.

FIGURE 1 is a diagrammatic cross-sectional view of that headlight in its operating condition. In this figure a few beams are shown which are produced by the filament which is arranged in the proximity of the focus of the uppermost reflector part and is destined for producing the anti-dazzle beam. The headlight comprises a cover glass which is shown in cross-section. To avoid drawing complexity the profile on that cover glass is not shown in FIGURE 1. In fact, this profile exerts its effect substantially in a horizontal direction, so at right angles to the plane of the drawing.

Figure 1:
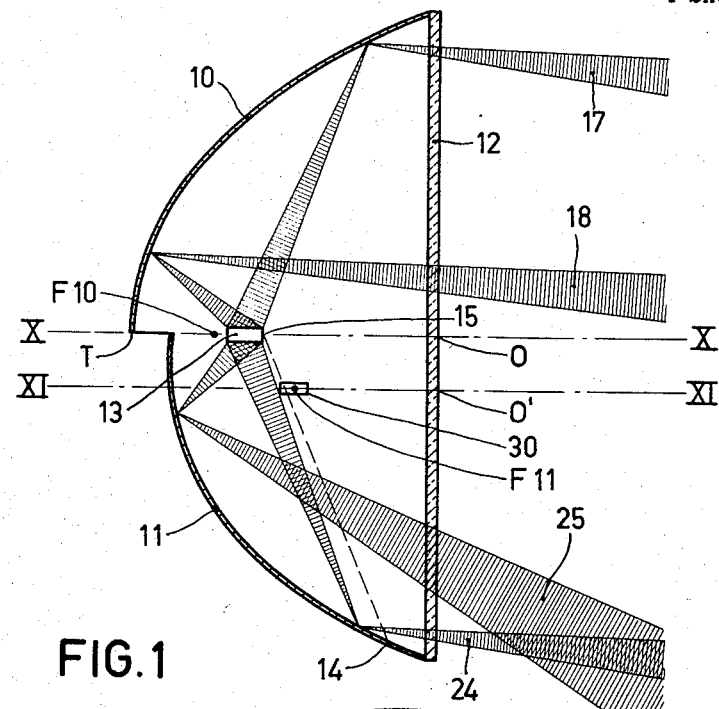
Figure 5:
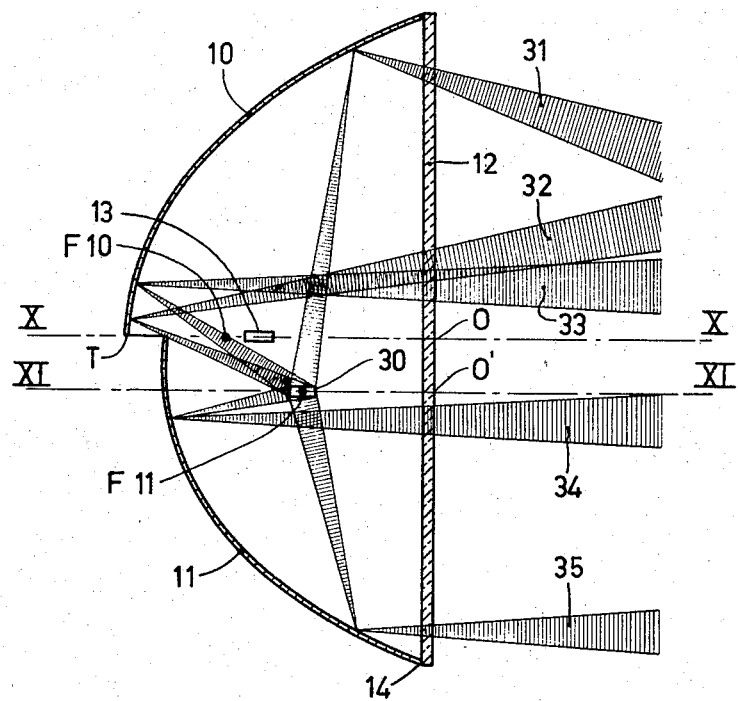

FIGURE 5 shows the same headlight as FIGURE 1. However, in this figure the lowermost filament operates instead of the uppermost filament. So in this case the headlight produces a beam with long-range properties. This follows from the light beams shown. The effect of the cover glass is not taken into account in FIGURE 5.

Figure 6:
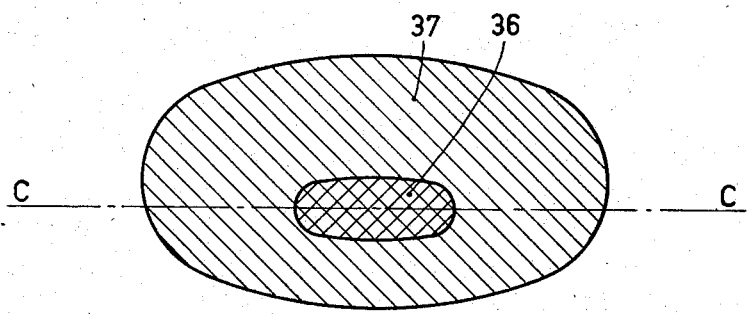

FIGURE 6 shows the beam pattern which is formed on the same screen by the lowermost filament. The beam pattern shown in FIGURE 6 is formed when the cover glass is removed.

Figure 7:
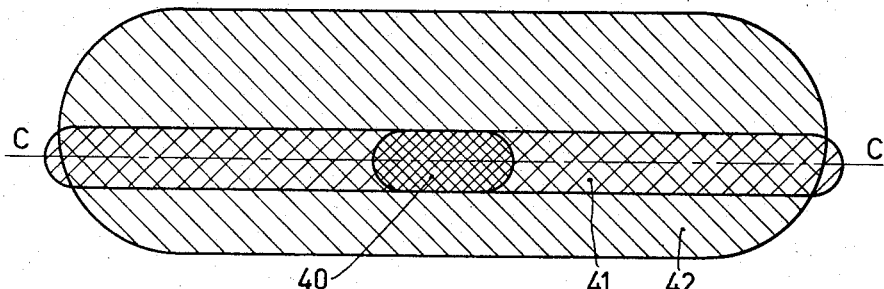

FIGURE 7 shows the beam pattern of FIGURE 6 spread by the cover glass.

Figure 8:
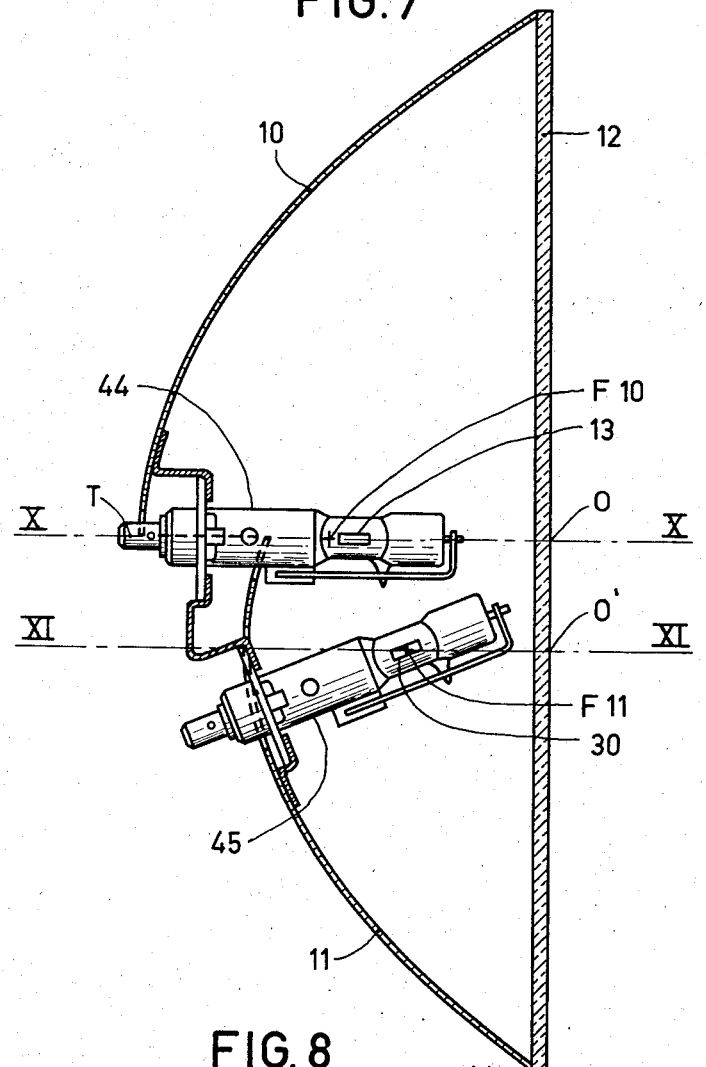

FIGURE 8 diagrammatically shows in what manner two iodine lamps can be arranged in the headlight shown in FIGURES 1 and 5.

Figure 2:
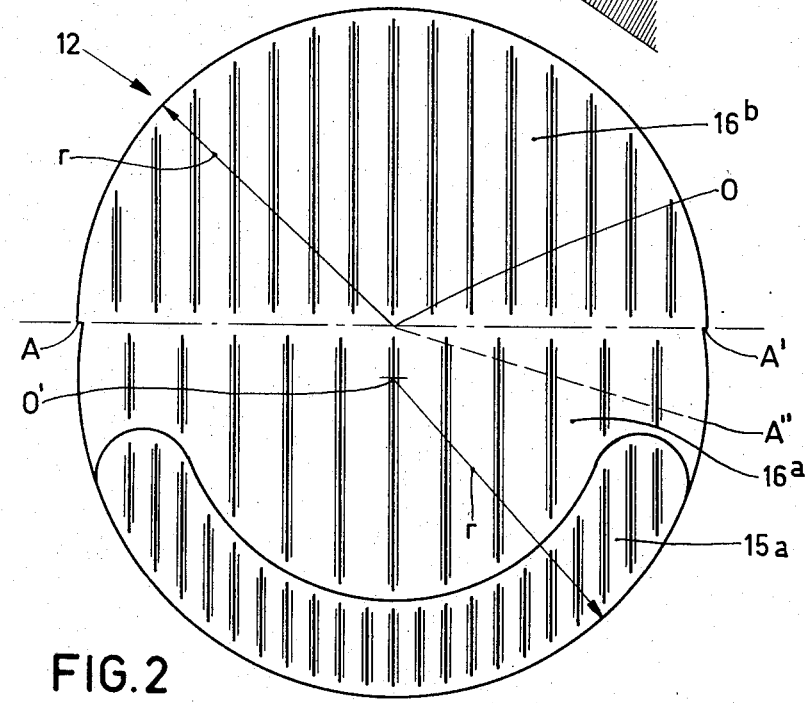
FIGURE 2 is a diagrammatic front view of the cover glass.

The headlight shown in FIGURES 1, 5 and 8 comprises a concave reflector system consisting of two parts 10 and 11 and a cover glass 12. The reflectors 10 and 11 respectively are formed as paraboloids of revolution with the axes X—X and XI—XI respectively. These axes intersect the cover glass in points O and O'. In the embodiment shown these axes are mutually parallel; however, they may enclose an angle of a few degrees with one another. The focus of the paraboloids of revolution 10 and 11 respectively lies at F10 and F11 respectively. The connection between the two mirror parts in this case extends according to a horizontal plane which contains the axis X—X and extends through the top T of the mirror system. In FIGURE 2 this connection is denoted by A-O-A'.

The opening of the mirror system thus formed is closed by the cover glass 12. The circumference of the said cover glass consists of two circular layers, one of which has O as its center and $r$ as its radius and the other has O' as its center and the same radius $r$. In practice, this non-circular circumference may be approached, for example, by a circle. From the figures it follows that the distance between the focus F10 and the cover glass 12 is larger than the distance between the focus F11 and the said cover glass.

A helical filament member 13 is arranged with its straight axis in the axis X—X in the paraboloid, so as to be located between F10 and the cover glass. In addition the arrangement of the filament 13, the focus F11 of the lowermost reflector part 11 and the lower limit 14 of that reflector part are chosen to be so that the line joining that end 15 of the fialment 13 which is facing the cover glass 12 and the focus F11 substantially passes through the lower edge 14 of the reflector half 11. Moreover, the cover glass 12 immediately adjoins the said lower edge 14.

The cover glass 12 shown in FIGURE 2 in front view comprises on its lower half, so below the line A-O-A', an approximately annular region 15a at the area of the outer edge, which region is provided with a profile having strong horizontally spreading properties. The remaining part 16a of the said lower half also has horizontally spreading properties which, however, produce a smaller lateral spreading of the traversing light than the profile of the zone 15a. The upper half 16b of the cover glass also comprises a vertical profile. In the embodiment shown it has a spreading action on the traversing light which is stronger than the spreading of the part 16a of the cover glass, but weaker than the region 15a.

Figure 3:
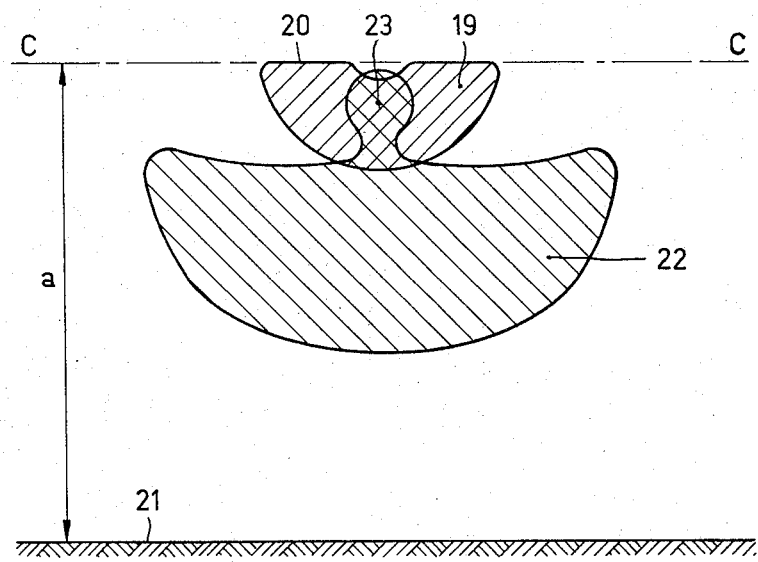
FIGURE 3 shows in what manner the pattern of the so-called anti-dazzle beam is formed by the uppermost and lowermost parts of the reflector in the headlight without cover glass. This pattern is formed on a screen which is arranged vertically at approximately 10 m. in front of the headlight.
Figure 4:
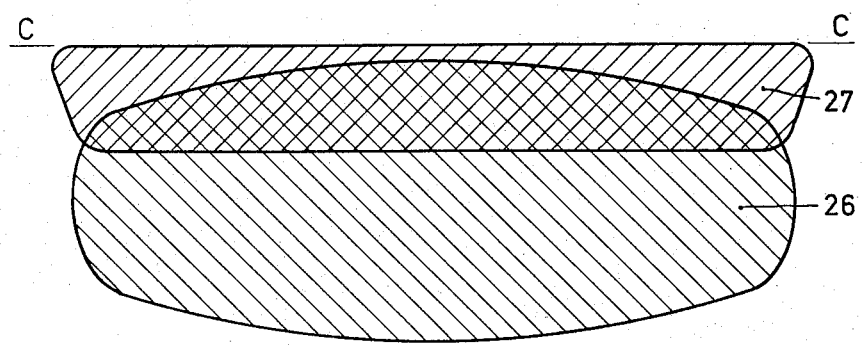
FIGURE 4 shows how the beam pattern shown in FIGURE 3 is transformed on the same screen when the headlight is provided with the cover glass shown in FIGURE 2.

All this results in the effect shown in FIGURES 1, 3 and 4. The upper half 10 of the reflector, when the filament 13 operates, produces light beams which are directed downwards and of which two are denoted by 17 and 18. Together they form a semicircular light spot 19 on a projection screen which is arranged vertically at a distance of approximately 10 m. from the headlight. This light spot is shown in FIGURE 3, in which the action of the cover glass has not been taken into account. The upper limit 20 of the said light spot extends horizontally. It can be adjusted so as to coincide with a horizontal line C—C which lies at a distance $a$ of 90 cm. above the surface 21 of the road. When the axis X—X of the uppermost reflector half is arranged horizontally, the line C—C is located approximately equally high above the road surface as the axis X—X. In addition, when the cover glass 12 is not provided a light spot 22 is produced by the co-operation of the filament 13 with the lower half 11 of the reflector which spot comprises at its upper side a projection 23. A few light beams which have contributed to the production of the said light spot are denoted by 24 and 25 in FIGURE 1. As a result of the fact that the filament 13 is located entirely behind the line joining F11 and the lower edge 14 of the reflector part 11, no dazzling light can be produced by the co-operation of the filament 13 with the reflector part. Nevertheless the whole available reflector surface is used for the formation of the anti-dazzle beam.

As a result of the presence of the annular region 15a, with strong horizontally spreading properties, the light which originates from the filaments 13 and which impinges upon the lowermost reflector half 11 will be strongly spread. All this is shown in FIGURE 4, in which the part 22–23 of the beam pattern of FIGURE 3 in a spread condition is denoted by 26. In addition, the part 19 also on the beam pattern which traverses the upper half of the cover glass 12 is spread. This has for its result that the light spot 19 is transformed to a wider pattern part 27. If required, the connection between the two reflector parts 10 and 11 need not be effected along the horizontal plane A-O-A', but along two planes which intersect one another in the axis X—X and one plane A-O of which is horizontal and the other plane O-A'' encloses an angle of 15° with the horizontal plane A-O-A'. The plane O-A'' is shown in broken lines in FIGURE 2. As a result of this the possibility is obtained of giving the anti-dazzle beam the dissymmetrical character which is commonly used nowadays. In the beam patterns, shown in FIGURES 3 and 4, however, the symmetrical beam pattern is shown for convenience.

In the headlight according to the invention, the specific advantage is obtained that, as a result of the direct connection of the cover glass 12 to the reflector opening, no light from the filament 13 is lost in a dead angle on the lower side of the headlight. On the other hand the reflector part 11 is used to advantage up to the line joining the focus F11 of the lower half 11 of the reflector and the end 15 of the filament 13 facing the cover glass.

In the manner described, an extremely economically operating headlight to produce an anti-dazzle beam is obtained.

A beam with long-range properties can be obtained by means of the second filament 30 in the headlight. This second filament is for that purpose arranged so that its axis coincides or encloses a small angle with the axis XI—XI of the lowermost reflector part 11 in a manner such that the forcus F11 lies approximately in the center of previty of the said filament from a point of view of light-technology.

FIGURE 5 shows a few beams 31, 32, 33, 34 and 35 emerging from the filament 30, which beams together form the beam pattern shown in FIGURE 6. In this figure, 36 is the light spot which originates from the lowermost reflector half 11 and 37 is the light spot which originates from the uppermost reflector half 10 and which partly coincides with the light spot 36 and partly is located around it.

The profile on the cover glass 12 has the following action on the beam pattern shown in FIGURE 6: The light spot 36 is slightly spread by the part 16a of the cover glass so that in the beam pattern shown in FIGURE 7 a nucleus 40 of low light intensity remains. The light which, after reflection, impinges upon the lowermost reflector half 11 and then traverses the region 15a is spread to a far stronger extent and results in the part 41 of the beam pattern. Light from the filament 30 which impinges upon the uppermost half 10 of the reflector is spread to a lesser extent and forms the light spot 42.

FIGURE 8 finally shows in what manner two substantially tubular filament lamps 44 and 45 can be provided in the headlight so as to be exchangeable.

What is claimed is:

1. A vehicle headlight comprising a reflector, a profiled cover glass for said reflector, said reflector constituting two concave mirrors, a filament co-acting with each concave mirror, said concave mirrors being upper and lower concave mirrors respectively and formed as paraboloids of revolution with noncoinciding axes, the focus of the upper concave mirror being more remote from said cover glass than the focus of said lower concave mirror is to said cover glass, the filament located parallel to the axis of said upper concave mirror has its axis situated between the focus of said upper concave mirror and the cover glass, said lower concave mirror extending toward said cover glass over such a distance that the elongation of the line through the end of said filament facing said cover glass and co-acting with said upper concave mirror and the focus of said lower concave mirror intersects the lower concave mirror substantially at its extreme edge adjacent to the bottom of said cover glass, and the area of the lower outer edge of said cover glass having a predetermined profile which causes a different measure of transverse spreading of the light projecting therethrough than the adjacent more central part of the lower half of said cover glass.

2. A vehicle headlight as claimed in claim 1 wherein said area at the lower edge in the lowermost half of said profiled cover class effects more transverse spreading of the light projecting through the cover glass than the adjacent more central part of said cover glass.

3. A vehicle headlight as claimed in claim 1 wherein a second filament is positioned with its axis in the focus of said lower concave mirror and parallel to the axis thereof.

4. A vehicle headlight as claimed in claim 3 wherein said filaments are separate, substantially tubular, interchangeable filament lamps of the regenerative type.

References Cited

UNITED STATES PATENTS

| 1,604,935 | 10/1926 | Smith | 240—41.4 |
| 1,756,301 | 4/1930 | Pech | 240—41.35 |

FOREIGN PATENTS 254,622  1/1961  Australia.

NORTON ANSHER, *Primary Examiner.*

W. M. FRYE, R. M. SHEER, *Assistant Examiners.*